United States Patent
Lee

(10) Patent No.: US 7,710,532 B2
(45) Date of Patent: May 4, 2010

(54) REFLECTIVE LIQUID CRYSTAL DISPLAY DEVICE HAVING CHOLESTERIC LIQUID CRYSTAL COLOR FILTER

(75) Inventor: Joun-Ho Lee, Dae-gu (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/957,583

(22) Filed: Oct. 5, 2004

(65) Prior Publication Data

US 2005/0041183 A1 Feb. 24, 2005

Related U.S. Application Data

(62) Division of application No. 10/293,434, filed on Nov. 14, 2002, now Pat. No. 6,809,786.

(30) Foreign Application Priority Data

Nov. 16, 2001 (KR) .............................. 2001-71519

(51) Int. Cl.
G02F 1/13 (2006.01)
(52) U.S. Cl. ....................................................... 349/187
(58) Field of Classification Search .................. 349/110
See application file for complete search history.

(56) References Cited

U.S. PATENT DOCUMENTS

| | | | | |
|---|---|---|---|---|
| 3,716,469 A | * | 2/1973 | Bhatt et al. ............ | 204/192.25 |
| 4,061,417 A | * | 12/1977 | Katagiri ....................... | 349/96 |
| 5,744,821 A | * | 4/1998 | Song ............................ | 257/59 |
| 5,801,797 A | * | 9/1998 | Iida et al. ...................... | 349/73 |
| 5,994,721 A | * | 11/1999 | Zhong et al. .................. | 257/89 |
| 6,025,899 A | | 2/2000 | Fukunaga et al. | |
| 6,268,895 B1 | * | 7/2001 | Shimada et al. ............. | 349/110 |
| 6,340,999 B1 | * | 1/2002 | Masuda et al. ................ | 349/63 |
| 6,674,495 B1 | * | 1/2004 | Hong et al. ................... | 349/43 |
| 6,690,443 B1 | * | 2/2004 | Poliakine ..................... | 349/152 |
| 6,833,891 B2 | * | 12/2004 | Jiang et al. ................... | 349/115 |
| 2002/0012096 A1 | * | 1/2002 | Uchiyama ..................... | 349/187 |
| 2002/0071085 A1 | * | 6/2002 | Huang et al. ................. | 349/149 |

* cited by examiner

Primary Examiner—Timothy Rude
(74) Attorney, Agent, or Firm—McKenna Long & Aldridge

(57) ABSTRACT

A reflective liquid crystal display device includes a first substrate including a display region and a first non-display region, the first non-display region being disposed at a boundary of the display region. A second substrate faces and is spaced apart from the first substrate, the second substrate including a second non-display region corresponding to a portion larger than the first substrate. A light absorption layer is on an inner surface of the first substrate. A cholesteric liquid crystal color filter (CCF) layer is at the display region and the first non-display region is on the light absorption layer. A common electrode is on the CCF layer. An array element is on an inner surface of the second substrate. A light shielding pattern is on the array element, the light shielding pattern corresponding to the CCF layer at the first non-display region. A retardation plate and a polarizing plate are sequentially formed on the outer surface of the second substrate. A liquid crystal layer is interposed between the common electrode and the array element.

5 Claims, 10 Drawing Sheets

REFLECTIVE LIQUID CRYSTAL DISPLAY DEVICE HAVING CHOLESTERIC LIQUID CRYSTAL COLOR FILTER

This application is a Divisional of application Ser. No. 10/293,434 filed Nov. 14, 2002, now U.S. Pat. No. 6,809,786 which is hereby incorporated by reference as if fully set forth herein.

This application claims the benefit of Korean Patent Application No. 2001-71519, filed on Nov. 16, 2001, which is hereby incorporated by reference as if fully set forth herein.

BACKGROUND OF THE INVENTION

1. Field of the Invention

The present invention relates to a liquid crystal display (LCD) device, and more particularly, to a reflective LCD device having a cholesteric liquid crystal (CLC) color filter.

2. Discussion of the Related Art

Presently, LCD devices are developed as next generation display devices because of their light weight, thin profile, and low power consumption characteristics. In general, an LCD device is a non-emissive display device that displays images using a refractive index difference utilizing optical anisotropy properties of liquid crystal material that is interposed between an array (TFT) substrate and a color filter (C/F) substrate. Among the various type of LCD devices commonly used, active matrix LCD (AM-LCD) devices have been developed because of their high resolution and superiority in displaying moving images. The AM-LCD device includes a thin film transistor (TFT) per each pixel region as a switching device, a first electrode for ON/OFF, and a second electrode used for a common electrode.

FIG. 1 is a perspective view of an LCD device according to the related art.

In FIG. 1, first and second substrates 10 and 30 are arranged to face each other with a liquid crystal material layer 50 interposed therebetween. On an inner surface of the first substrate 10, a color filter (C/F) layer 12 and a common electrode 16, which functions as one electrode for applying an electric field to the liquid crystal layer 50, are subsequently formed. The C/F layer 12 includes a color filter for transmitting only light of a specific wavelength, and a black matrix (not shown) that is disposed at a boundary of the color filter and shields light of a region in which alignment of the liquid crystal material is uncontrollable. On an inner surface of the second substrate 30, a plurality of gate lines 32 and a plurality of data lines 34 are formed in a matrix array. A TFT "T", which functions as a switching device, is disposed at a region where each gate line 32 and data line 34 crosses, and a pixel electrode 46 that is connected to the TFT "T" is disposed at a pixel region "P" defined by the region where the gate and data lines 32 and 34 cross. First and second polarizing plates 52 and 54, which transmit only light parallel to a polarizing axis, are disposed on an outer surface of the first and second substrates 10 and 30, respectively. An additional light source such as a backlight, for example, is disposed below the second polarizing plate 54.

The LCD device of FIG. 1 is a transmissive LCD device that displays images by transmitting only desired light through the first substrate using an optic/dielectric anisotropy of the liquid crystal layer after light from the backlight passes through the second substrate.

FIG. 2 is a schematic plan view of an LCD device according to the related art. FIG. 2 shows gate and data pads for connection with an external circuit.

In FIG. 2, a liquid crystal panel 60 for an LCD device includes a first substrate 10, a second substrate 30 larger than the first substrate 10, and a liquid crystal layer 50 interposed between the first and second substrates 10 and 30. The liquid crystal panel 60 can be divided into a display region "D," and first and second non-display regions "N1" and "N2" in plan view. The first non-display region "N1" is defined by the first and second substrates 10 and 30, and the second non-display region "N2" is defined by a larger portion of the second substrate 30. Elements such as a TFT, gate and data lines, a pixel electrode, a color filter layer and a common electrode illustrated in FIG. 1 are formed in the display region "D." Gate and data pads 62 and 64 connected to an external circuit (not shown) are formed in the second non-display region "N2" to apply a display signal to the display region "D." Since a black matrix 66 formed in the first non-display region "N1" of the first substrate 10 absorbs incident light, a boundary of the display region "D" maintains a black state.

FIG. 3 is a schematic cross-sectional view of an LCD device according to the related art. A boundary of a display region is mainly shown in FIG. 3.

In FIG. 3, a boundary of first and second substrates 10 and 30 with a liquid crystal layer 50 therebetween is sealed with a seal pattern 68. A color filter layer 40 on an inner surface of the first substrate 10 is extended to a first non-display region "N1" so that a deterioration at a boundary of a display region "D" by a step difference between the display region "D" and the first non-display region "N1" can be prevented during a rubbing process for aligning the liquid crystal layer 50. Array elements 42 such as a TFT and a pixel electrode (of FIG. 1) are formed on an inner surface of the second substrate 30. When light is emitted into the first non-display region "N1," a black matrix 66 of the first non-display region "N1" absorbs the light. Accordingly, a black state is maintained in the boundary of the display region "D."

Reflective LCD devices without a backlight are being researched and developed. Transflective LCD devices use a backlight to provide light. However, only about 7% of the light that is emitted by the backlight passes through each cell of the LCD device. Since the backlight should emit light of a relatively high brightness, corresponding power consumption increases. Accordingly, a large capacity heavy battery is commonly used to supply sufficient power for the backlight. Moreover, use of the large capacity battery limits operating time. On the other hand, because power consumption of the reflective LCD devices greatly decreases due to use of ambient light as a light source, operating time increases. Such reflective LCD devices are used for portable information apparatuses such as electronic diaries and personal digital assistants (PDAs). In the reflective LCD devices, a pixel area, which is covered with a transparent electrode in conventional transmissive LCD devices, is covered with a reflective plate or reflective electrode having opaque reflection characteristics.

However, brightness of reflective LCD devices is very poor because the devices use only ambient light as a light source. The poor brightness results from operational characteristics of the reflective LCD devices in which ambient light which passes through a color filter substrate, is reflected on a reflective electrode on a second substrate, is passed through the color filter substrate again and then displays an image. Accordingly, brightness is decreased as a result of reduction of the transmittance when the ambient light passes through a color filter layer twice. Since overall thickness of the color filter layer is inversely proportional to transmittance and is directly proportional to color purity of the light, the problem of inadequate brightness of the reflective LCD devices can be remedied by forming a thin color filter layer with high transmittance and low color purity. However, there is a limit in fabricating the color filter layer below a threshold thickness due to characteristics of the resin used to form the color filter layer.

Accordingly, one possible solution to this problem is fabricating LCD devices using cholesteric liquid crystal (CLC) that has selective reflection and transparency characteristics. In reflective LCD devices using a CLC color filter (CCF) layer, the fabrication processes are simplified due to omission of the reflective layer, and high color purity and high contrast ratio are achieved. Moreover, since CLC has a spiral structure and spiral pitch determines a selective reflection bandwidth of the CLC, the reflection bandwidth can be controlled by a distribution of the spiral pitch at one pixel. To illustrate this in more detail, a wavelength range of visible light is from about 400 nm to about 700 nm. The wavelength of the red light region is centered at about 650 nm, the wavelength of the green light region is centered at about 550 nm, and the wavelength of the blue light region is centered at about 450 nm. The CCF layer is formed having characteristics that can selectively reflect or transmit right-handed or left-handed circularly polarized light at a bandwidth that corresponds to a pitch deviation by selecting bandwidths corresponding to the red, green, and blue light regions. In addition, the CCF layer is formed having characteristics that control conditions for right or left pitch deviations with respect to the center wavelength. Accordingly, the pitch of the liquid crystal can be artificially adjusted so that a CCF layer can selectively reflect light of an intrinsic wavelength of the color corresponding to each pixel.

FIG. 4 is a schematic plan view of a reflective LCD device using a CCF layer according to the related art. FIG. 4 shows gate and data pads for connection with an external circuit.

In FIG. 4, since the reflective LCD device using a CCF layer displays images by reflecting ambient light, array elements (not shown) and a CCF layer are formed on first and second substrates 70 and 72, respectively. Accordingly, the first substrate is larger than the second substrate 72. As a result, even though a display region "D" is disposed as in the LCD device of FIG. 3, a first non-display region "N1" corresponds to a boundary of the second substrate 72 and a second non-display region "N2" corresponds to a larger portion of the first substrate 70. Especially, even though a black matrix is disposed at the first non-display region adjacent to the display region in the LCD device of FIG. 3, an additional black matrix between adjacent pixels is omitted due to a selective reflection property of the CCF layer and a metal bar 78 of one material of a gate pad 74 and a data pad 76 is disposed at the first non-display region "N1" not adjacent to the second non-display region "N2" to prevent light reflection in the reflective LCD device using a CCF layer. However, an extra metal bar to prevent light reflection is not disposed at the first non-display region "N1" adjacent to the second non-display region "N2" where the gate pad 74 and the data pad 76 are formed.

FIG. 5 is a schematic cross-sectional view of a reflective LCD device using a CCF layer according to the related art. A boundary of a display region is mainly shown in FIG. 5.

In FIG. 5, a first substrate 70 including array elements 86 and a second substrate 72 including a CCF layer 82 face each other. Incident light into the CCF layer 82 displays colors by the CCF layer 82 whose pitch is adjusted according to a wavelength of each color. These colors constitute desired images by a refractive index difference at a liquid crystal layer (not shown) interposed between the first and second substrates 70 and 72. To illustrate this in more detail, the array elements 86 are formed on an inner surface of the first substrate 70 and a light absorption layer 80 is formed on an entire inner surface of the second substrate 72. The CCF layer 82 is formed at a display region "D" and a first non-display region "N1" on the light absorption layer 80. A common electrode 84 is formed on the light absorption layer 80 and the CCF layer 82. The array elements 72 on the second substrate 30 of FIG. 3 can be used as the array elements 86.

When external light enters the CCF layer 82 at the first non-display region "N1," the CCF layer 82 reflects a circularly polarized light such as left-handed or right-handed circularly polarized lights and the circularly polarized light is emitted to an exterior without passing through an additional light shielding layer. Accordingly, brightness undesirably increases at a boundary of the display region and a display quality of the reflective LCD device decreases.

SUMMARY OF THE INVENTION

Accordingly, the present invention is directed to a reflective liquid crystal display device that substantially obviates one or more of problems due to limitations and disadvantages of the related art.

An advantage of the present invention is to provide a reflective liquid crystal display device of high display quality using a cholesteric liquid crystal color filter layer by reducing brightness at a boundary of a display region.

Another advantage of the present invention is to provide a reflective liquid crystal display device including a light shielding pattern corresponding to a cholesteric liquid crystal color filter layer at a non-display region of a lower substrate.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a reflective liquid crystal display device includes: a first substrate including a display region and a first non-display region, the first non-display region being disposed at a boundary of the display region; a second substrate facing and spaced apart from the first substrate, the second substrate including a second non-display region corresponding to a portion larger than the first substrate; a light absorption layer on an inner surface of the first substrate; a cholesteric liquid crystal color filter (CCF) layer at the display region and the first non-display region on the light absorption layer; a common electrode on the CCF layer; an array element on an inner surface of the second substrate; a light shielding pattern on the array element, the light shielding pattern corresponding to the CCF layer at the first non-display region; a retardation plate and a polarizing plate sequentially formed on the outer surface of the second substrate; and a liquid crystal layer interposed between the common electrode and the array element.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to embodiments of the present invention, example of which is illustrated in the accompanying drawings. Wherever possible, the same reference numbers will be used throughout the drawings to refer to the same or like parts.

Figure 1:
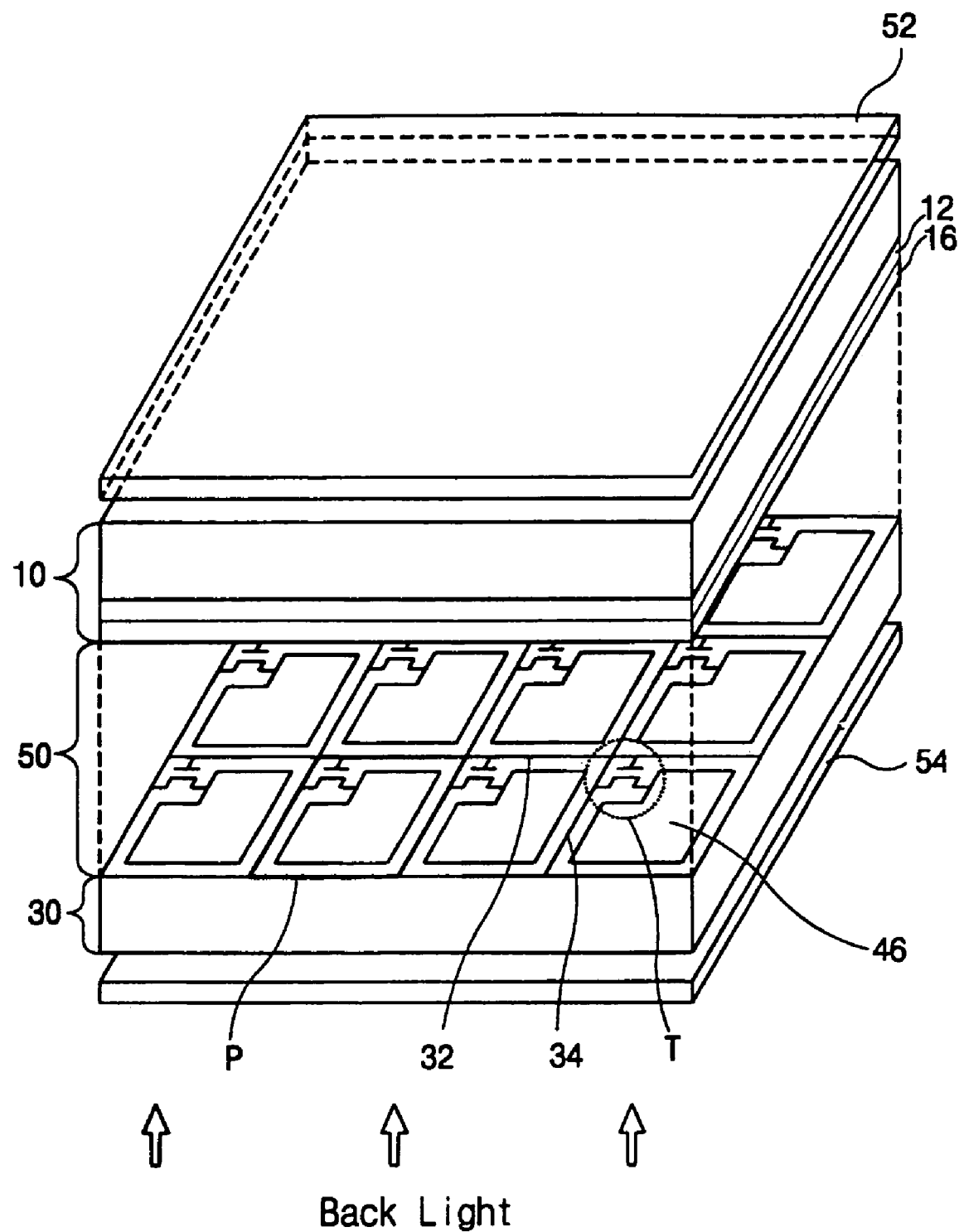
FIG. 1 is a perspective view of an LCD device according to the related art.
Figure 2:
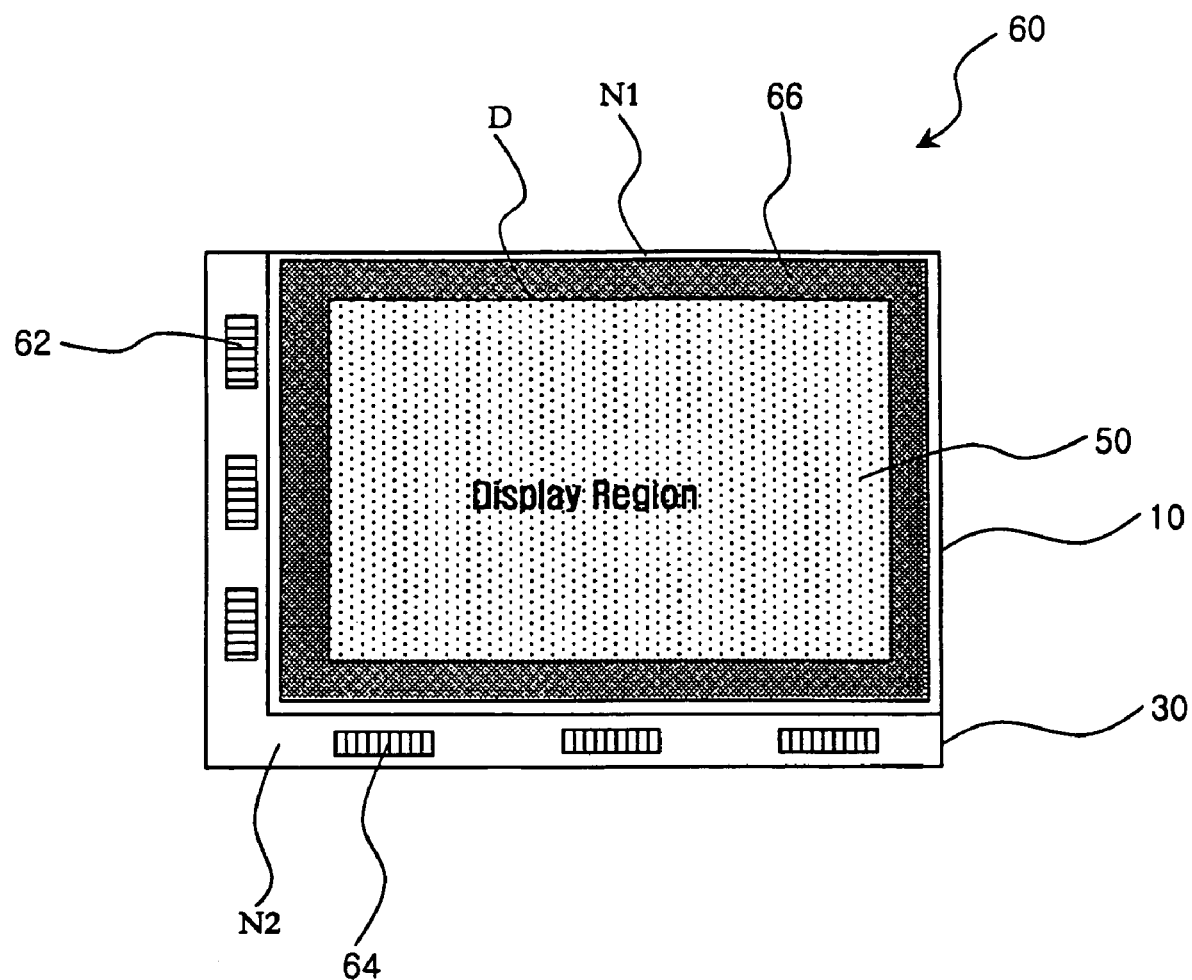
FIG. 2 is a schematic plan view of an LCD device according to the related art.
Figure 3:
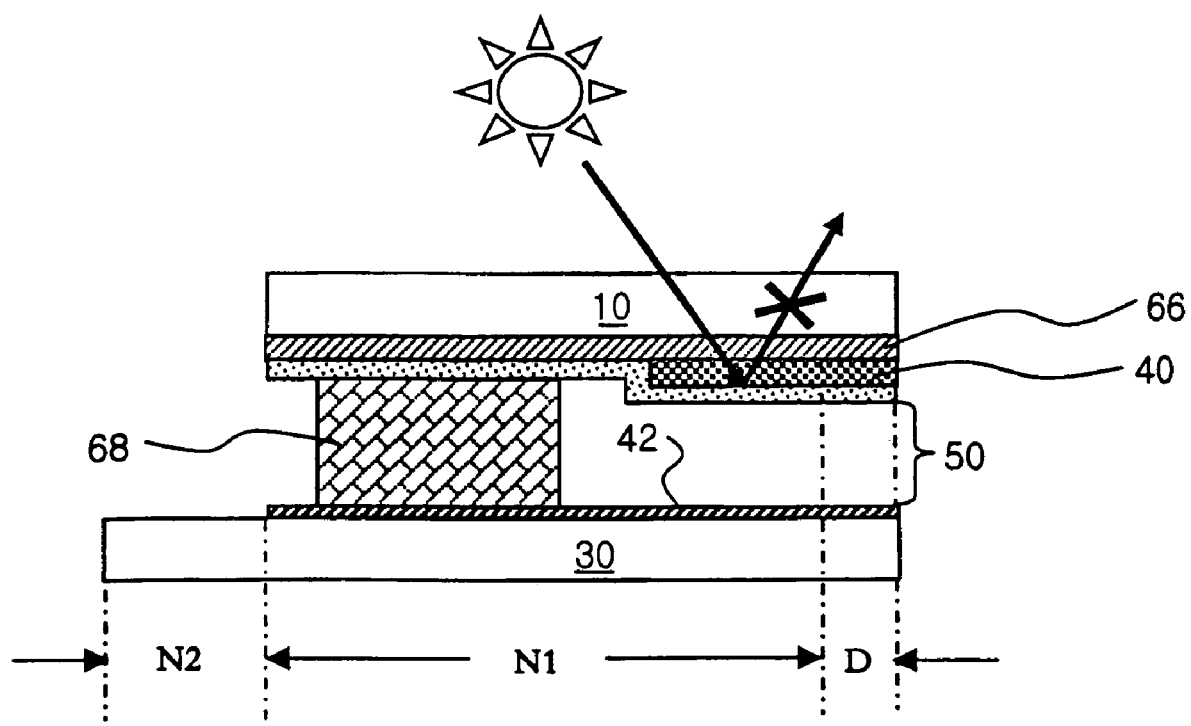
FIG. 3 is a schematic cross-sectional view of an LCD device according to the related art.
Figure 4:
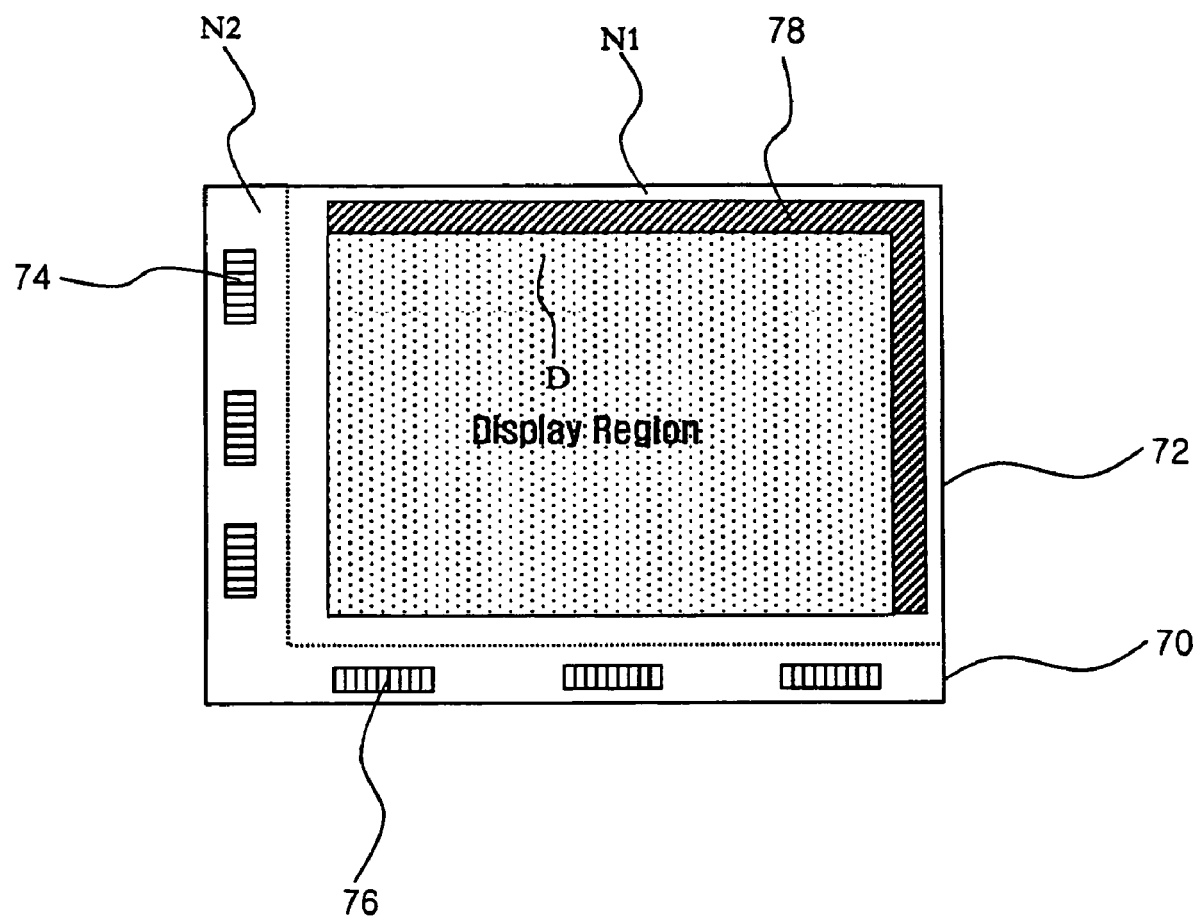
FIG. 4 is a schematic plan view of a reflective LCD device using a CCF layer according to the related art.
Figure 5:
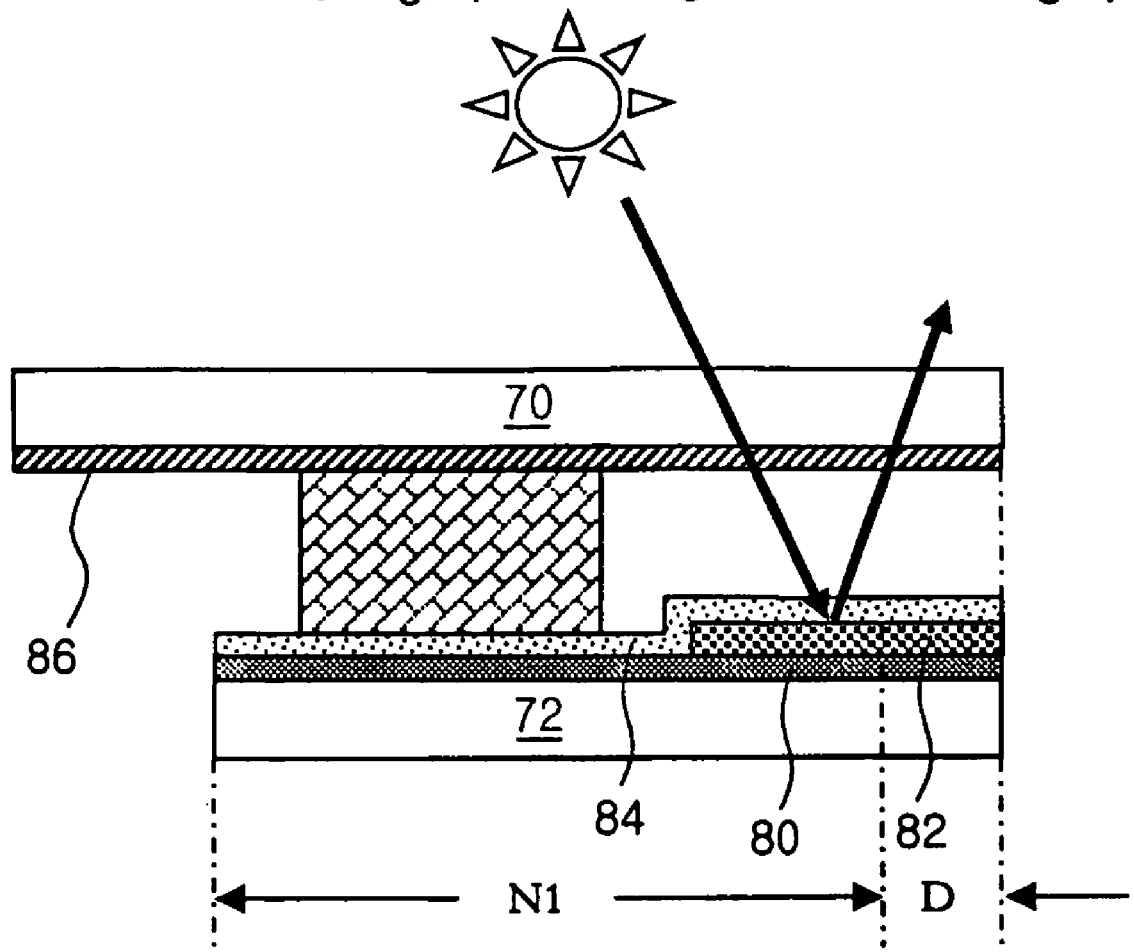
FIG. 5 is a schematic cross-sectional view of a reflective LCD device using a CCF layer according to the related art.
Figure 6:
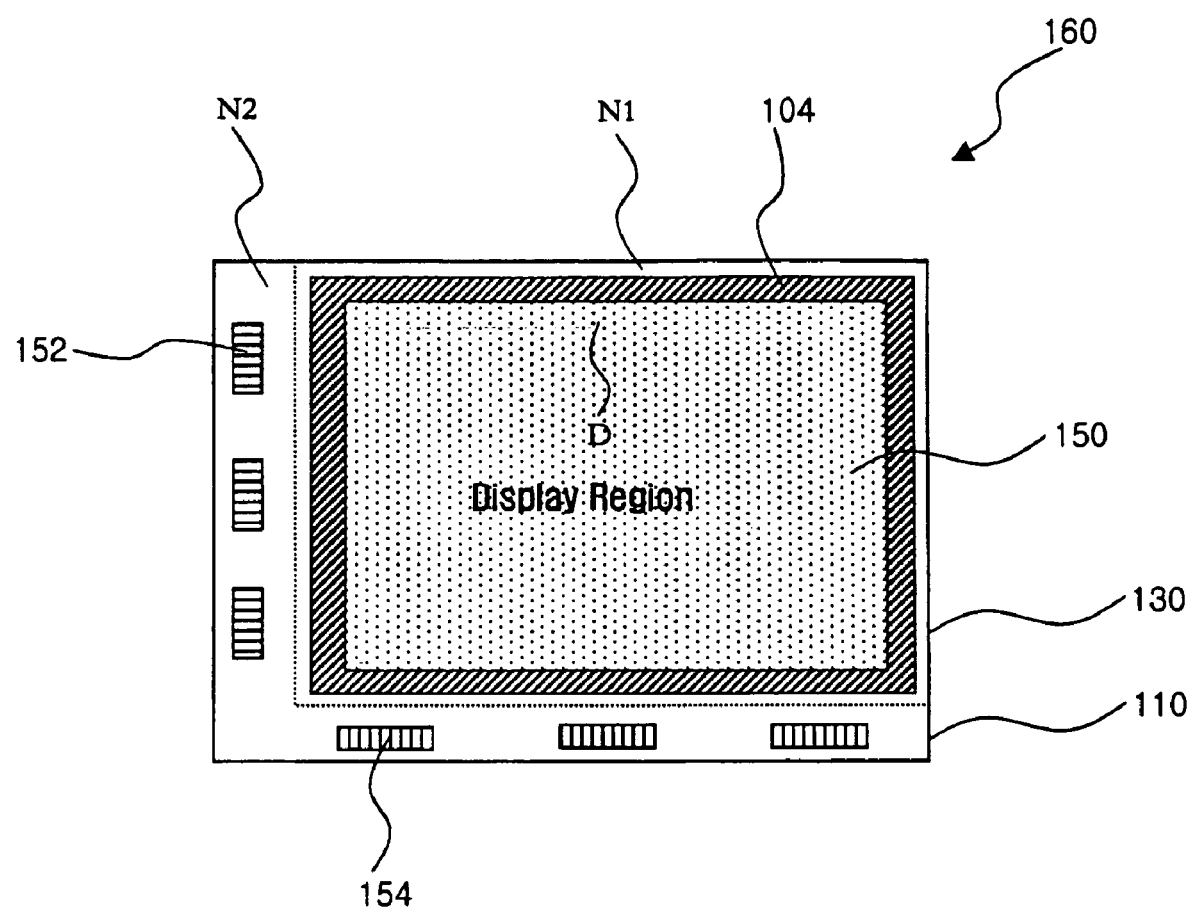
FIG. 6 is a schematic plan view of a reflective LCD device using a CCF layer according to an embodiment of the present invention.

FIG. 6 is a schematic plan view of a reflective LCD device using a CCF layer according to an embodiment of the present invention. A boundary of a display region is shown in FIG. 6.

FIG. 6, a liquid crystal panel 160 includes a first substrate 110, a second substrate 130 smaller than the first substrate 110 and a liquid crystal layer 150 interposed between the first and second substrates 110 and 130. The liquid crystal panel 160 can be divided into a display region "D," and first and second non-display regions "N1" and "N2" in plan view. The first non-display region "N1" is adjacent to a boundary of the display region "D" and is defined by the first and second substrates 110 and 130. The second non-display region "N2" corresponds to a larger portion of the first substrate 110. A gate pad 152 and a data pad 154 are disposed at the second non-display region "N2" of the first substrate 110. Moreover, a light shielding pattern 104 adjacent to the display region "D" is disposed at the first non-display region "N1." The light shielding pattern 104 is made of an organic material absorbing light. The light shielding pattern 104 is formed not through an additional process but through a process of forming a black matrix (not shown) that prevents light from entering a switching element (not shown) on the first substrate 110.

Figure 7:
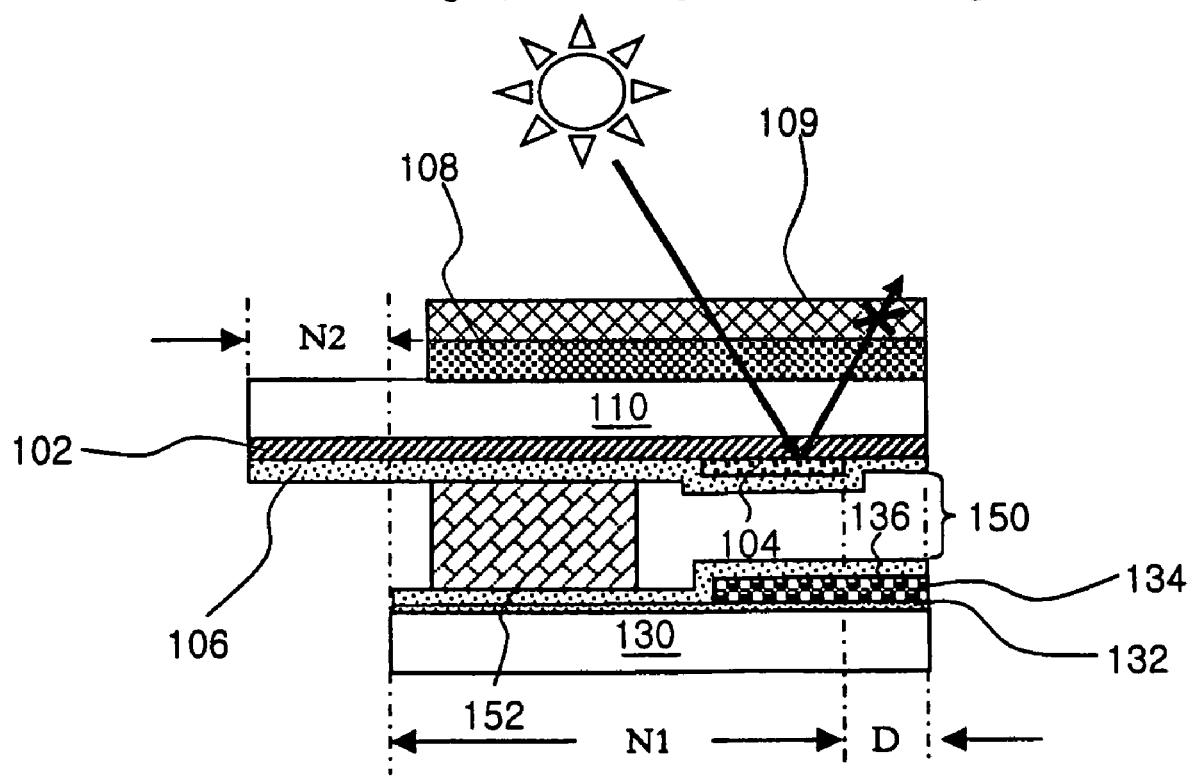
FIG. 7 is a schematic cross-sectional of a reflective LCD device according to an embodiment of the present invention.

FIG. 7 is a schematic cross-sectional of a reflective LCD device according to an embodiment of the present invention. A boundary of a display region is mainly shown in FIG. 7.

In FIG. 7, a first substrate 110 and a second substrate 130 face and are spaced apart from each other. A light absorption layer 132 is formed on an inner surface of the second substrate 130 and a CCF layer 134 is formed on the light absorption layer 132 at a display region "D" and a first non-display region "N1." A common electrode 136 is formed on the CCF layer 134 and the light absorption layer 132. Array elements 102 are formed on an inner surface of the first substrate 110 and a light shielding pattern 104 is formed on the array elements 102 at the first non-display region "N1" adjacent to the display region "D." A protection layer 106 is formed on the light shielding pattern 104 and the array elements 102. The protection layer 106, which covers, the array elements 102, is different from a passivation layer for a TFT in that the protection layer 106 functions as a buffer layer between the light shielding pattern 104 and a liquid crystal layer 150. A retardation plate 108 and a polarizing plate 109 are sequentially formed on an outer surface of the first substrate 110. The polarizing plate 109 is a linear polarizing plate transmitting only light parallel to a polarization axis of the polarizing plate 109 and the retardation plate 108 is a quarter wave plate (QWP) whose slow axis makes one angle of +45° and −45° with respect to the polarization axis. The slow axis is defined by a direction parallel to the direction along which the refractive index of the QWP is larger than along any other direction. The QWP transforms linearly polarized light into circularly polarized light by a retardation value of $\lambda/4$, and vice versa. When the slow axis makes an angle of +45° with respect to the polarization axis, the QWP transforms linearly polarized light into left-handed circularly polarized light. On the other hand, when the slow axis makes an angle of −45° with respect to the polarization axis, the QWP transforms linearly polarized light into right-handed circularly polarized light. Furthermore, a seal pattern 152 is formed at the first non-display region "N1" to attach the first and second substrates 110 and 130.

Light passing through each cell at the boundary of the display region "D" of the reflective LCD device using the CCF layer is illustrated in detail with an assumption that the CCF layer 134 selectively reflects only a right-handed circularly polarized light and the retardation plate 108 has a slow axis making an angle of −45° with respect to the polarization axis. External light is transformed into linearly polarized light for passing through the polarizing plate 109 and the linearly polarized light is transformed into right-handed circularly polarized light for passing through the retardation plate 108. Since the right-handed circularly polarized light is absorbed into the light shielding pattern of a material absorbing light, a black state is obtained. Accordingly, a white phenomenon at the boundary of the display region can be prevented.

Figure 8:
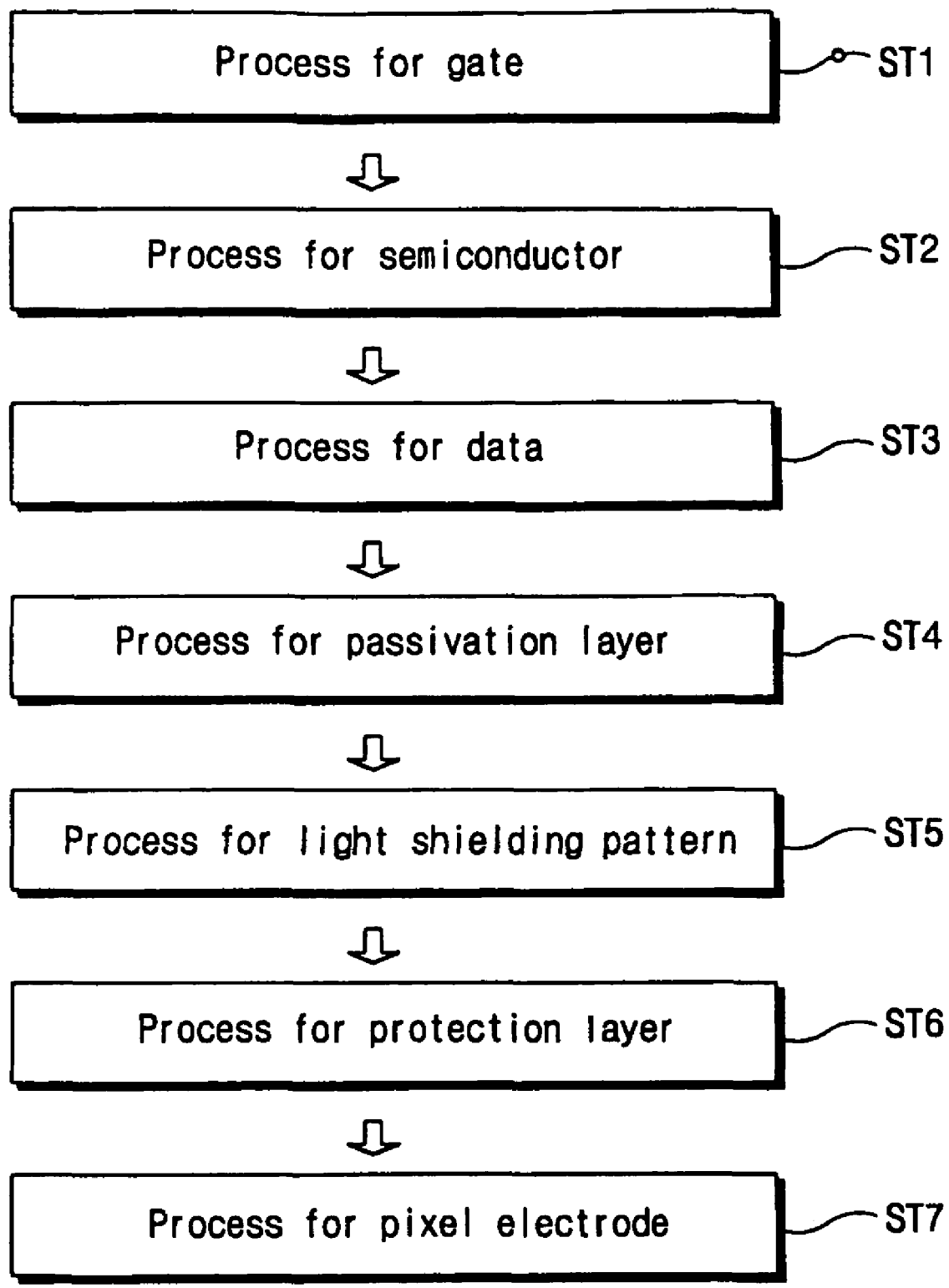
FIG. 8 is a flow chart illustrating a fabricating process of a substrate including a light shielding pattern according to an embodiment of the present invention.

FIG. 8 is a flow chart illustrating a fabricating process of a substrate including a light shielding pattern according to an embodiment of the present invention.

At step ST1, after a first metallic material is deposited on a substrate, a gate line including a gate electrode and a gate pad is formed through a photolithography including exposure, development and etch processes.

At step ST2, after silicon nitride (SiNx), amorphous silicon (a-Si) and impurity-doped amorphous silicon (n+ a-Si) are sequentially deposited on an entire surface of the substrate, the a-Si and the n+ a-Si are etched through a photolithography to form an active layer and an ohmic contact layer, respectively. The SiNx functions as a gate insulating layer. The active layer and the ohmic contact layer constitute a semiconductor layer.

At step ST3, after a second metallic material is deposited on an entire surface of the substrate, a data line including source and drain electrodes spaced apart from each other is formed through a photolithography. In this step, a channel is formed through exposing the active layer between the source and drain electrodes. Thus, a thin film transistor (TFT) including the gate electrode, the semiconductor layer, and the source and drain electrodes is completed.

At step ST4, a passivation layer is formed on the TFT, the gate line and the data line through depositing or coating a material for the passivation layer. The passivation layer has a drain contact hole exposing the drain electrode through a photolithography.

At step ST5, a black matrix and a light shielding pattern are formed on the passivation layer. The black matrix and the light shielding pattern correspond to the TFT and a first non-display region adjacent to a display region, respectively.

At step ST6, after an organic insulating material is coated on the black matrix and the light shielding pattern, a protection layer having a contact hole corresponding to the drain contact hole is formed through a photolithography.

At step ST7, after a transparent conductive material is deposited on the protection layer, a pixel electrode is formed through a photolithography. The pixel electrode is connected to the drain electrode through the drain contact hole. Moreover, an orientation film is formed on the pixel electrode to align a liquid crystal layer.

Figure 9:
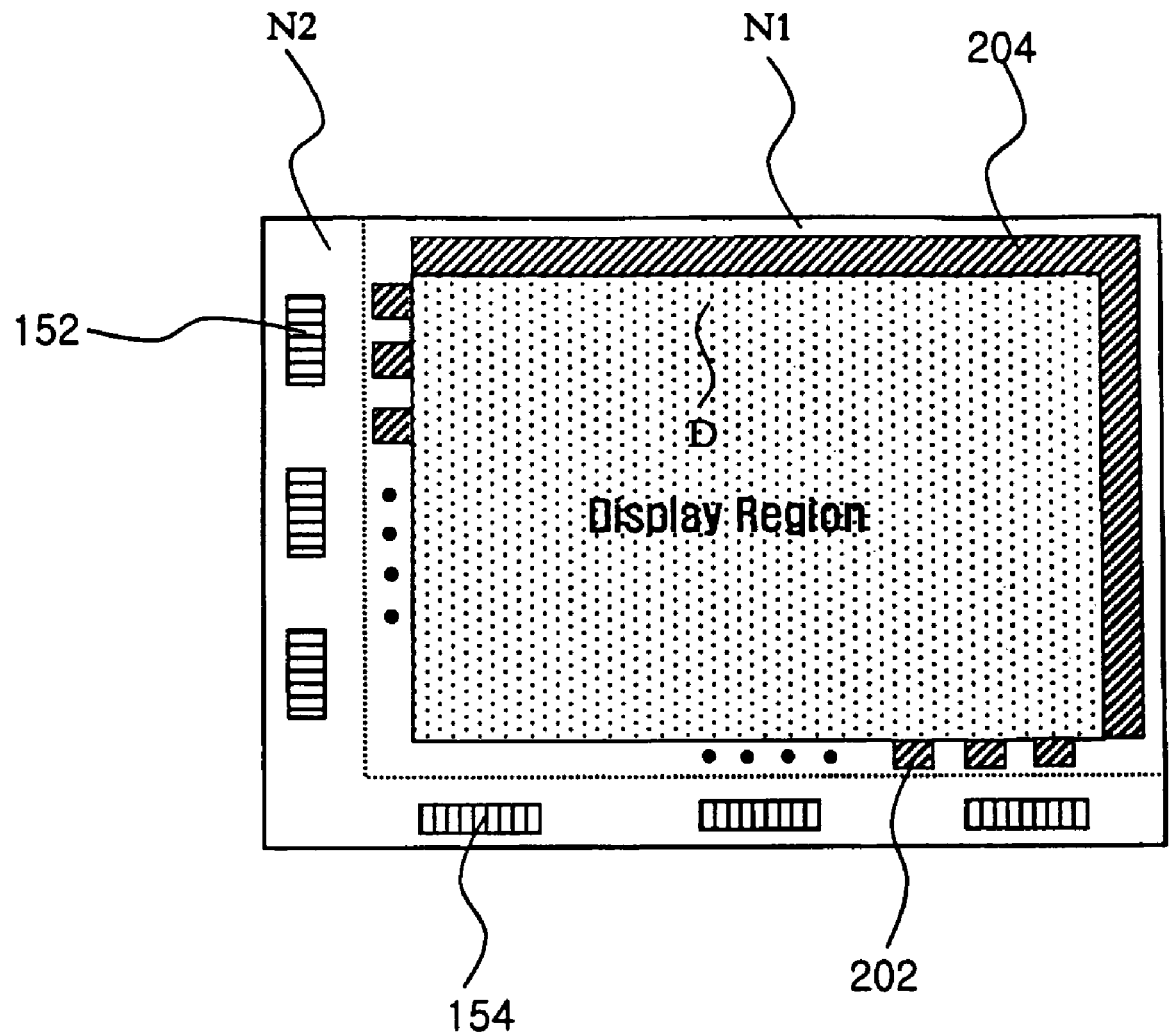
FIG. 9 is a schematic plan view of a reflective LCD device using a CCF layer according to another embodiment of the present invention.

FIG. 9 is a schematic plan view of a reflective LCD device using a CCF layer according to another embodiment of the present invention. Illustrations for the same portion as the reflective LCD device of FIG. 6 will be omitted.

In FIG. 9, a plurality of light shielding patterns 202 are formed at a first non-display region "N1" adjacent to a second non-display region "N2." The plurality of light shielding patterns 202 are made of the same material as a gate pad 152 and a data pad 154. Here, the plurality of light shielding patterns 202 adjacent to a display region "D" prevent a white phenomenon of a boundary of the display region "D." If the plurality of light shielding patterns 202 cover a gate line and a data line (not shown), a parasitic capacitor degrading a display quality can be generated between the plurality of light shielding patterns 202 and the gate and data lines. Accordingly, the plurality of light shielding patterns 202 are formed at spaces between the adjacent gate lines and between the adjacent data lines. However, if the plurality of light shielding patterns 202 are formed exactly at the spaces between the gate lines and between the data lines, a light leakage can occur in the case of misalignment. Therefore, the plurality of light shielding patterns 202 overlap the gate and data lines within a range of about 1 μm to about 3 μm to maintain a black state at the boundary of the display region "D." Moreover, the plurality of light shielding patterns 202 are made of the same material as the data line at the space between the gate lines, and made of the same material as the gate line at the space between the data lines to prevent an electric short between the plurality of light shielding patterns 202 and the gate and data lines without an additional process. A metal bar 204 of one material of the gate pad 152 and the data pad 154 is disposed at the first non-display region "N1" not adjacent to the second non-display region "N2" to prevent light reflection in the reflective LCD device using a CCF layer.

As in the reflective LCD device of FIG. 6, under the assumption that the CCF layer (not shown) selectively reflects only a right-handed circularly polarized light and the retardation plate (not shown) has a slow axis making an angle of −45° with respect to a polarization axis, external light is transformed into linearly polarized light for passing through the polarizing plate and the linearly polarized light is transformed into right-handed circularly polarized light for passing through the retardation plate. Since the right-handed circularly polarized light is absorbed into the light shielding pattern of the same material as the gate and data lines, a black state is obtained. Accordingly, a white phenomenon at the boundary of the display region can be prevented.

Figure 10:
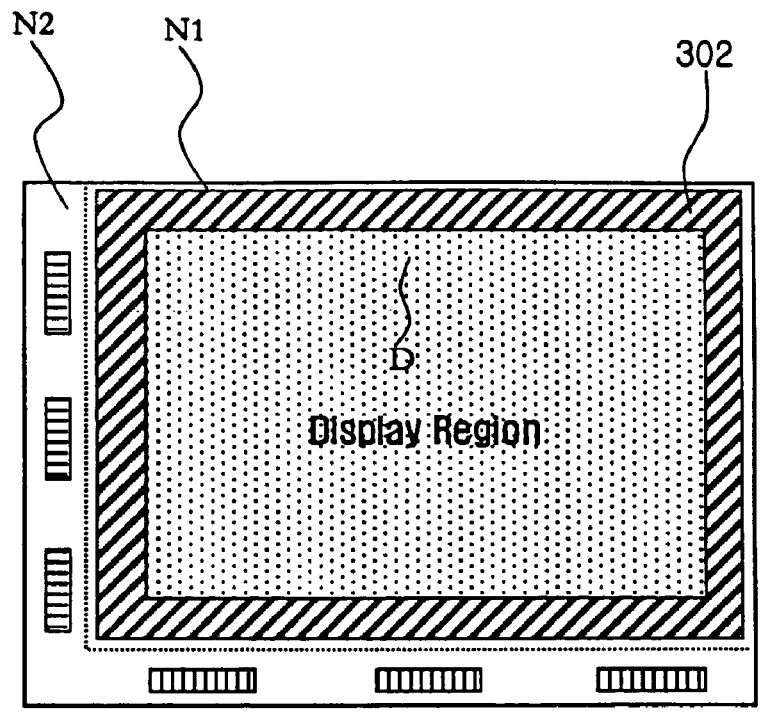
FIG. 10 is a schematic plan view of a reflective LCD device using a CCF layer according to another embodiment of the present invention.

FIG. 10 is a schematic plan view of a reflective LCD device using a CCF layer according to another embodiment of the present invention. Illustration for the same portion as the reflective LCD device of FIG. 9 will be omitted.

In FIG. 10, a light shielding pattern 302 of a transparent conductive material is formed at a first non-display region "N1" adjacent to a display region "D." The light shielding pattern 302 is simultaneously formed with a pixel electrode using the same material as the pixel electrode. Moreover, the light shielding pattern 302 may be electrically isolated from the pixel electrode. Instead, the light shielding pattern 302 may be connected to a common electrode (not shown) of a second substrate (not shown) through a silver (Ag) dot point for an electric connection between first and second substrates. Accordingly, a same signal is applied to the light shielding pattern 302 and the common electrode.

Figure 11:
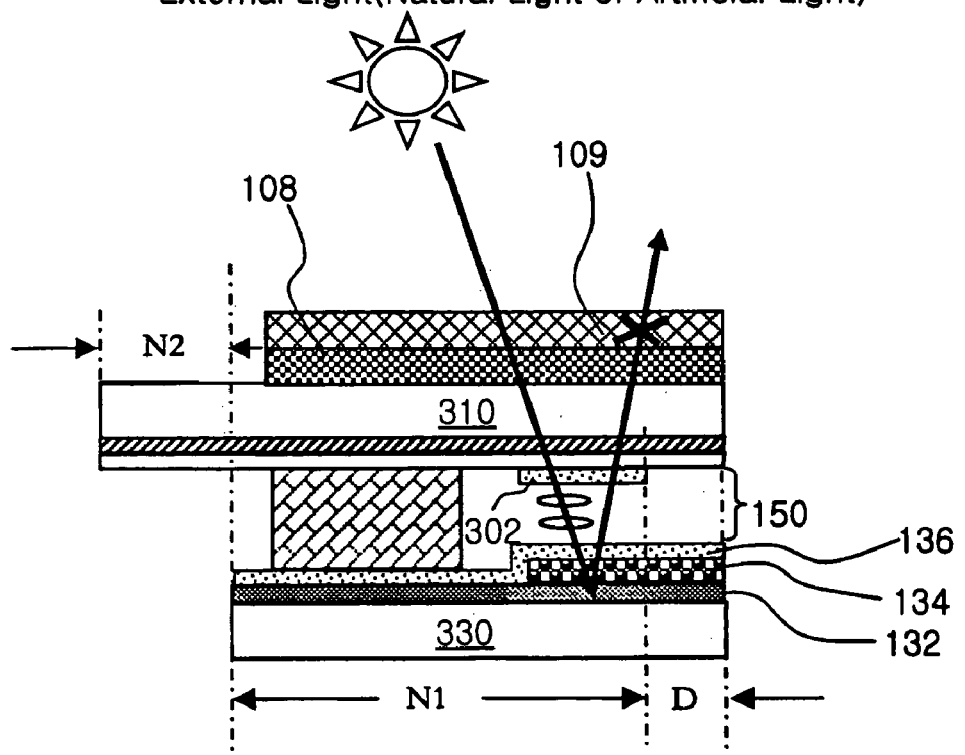
FIG. 11 is a schematic cross-sectional view of a reflective LCD device using a CCF layer according to another embodiment of the present invention.

FIG. 11 is a schematic cross-sectional view of a reflective LCD device using a CCF layer according to another embodiment of the present invention. Illustration for the same portion as the reflective LCD device of FIG. 7 will be omitted.

In FIG. 11, since a same signal is applied to a light shielding pattern 302 at a first non-display region "N1" adjacent to a display region "D" and a common electrode 136 over a second substrate 330, a liquid crystal layer 150 between the light shielding pattern 302 and the common electrode 136 functions as a π-cell to have a retardation of λ/2.

As in the reflective LCD device of FIG. 7, under the assumption that a CCF layer 134 selectively reflects only a right-handed circularly polarized light and the retardation plate 108 has a slow axis making an angle of −45° with respect to a polarization axis of a polarizing plate 109, external light is transformed into linearly polarized light for passing through the polarizing plate 109 and the linearly polarized light is transformed into right-handed circularly polarized light for passing through the retardation plate 108. Since the right-handed circularly polarized light is transformed into a left-handed circularly polarized light for passing through the liquid crystal layer 150 having a retardation of λ/2, the left-handed circularly polarized light is absorbed into a light absorption layer 132 under the CCF layer 134 at the first non-display region "N1." Accordingly, a black state is obtained at a boundary of the display region "D" and a white phenomenon at the boundary of the display region "D" is effectively prevented.

Consequently, since a light shielding pattern is included in a reflective LCD device using a CCF layer according to the present invention, a black state is kept at a boundary of a display region and a display quality is improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of manufacturing a reflective liquid crystal display device, comprising:
   providing a first substrate including a display region and a first non-display region, the first non-display region being disposed at a boundary of the display region;
   depositing a first metallic material on the first substrate to form a gate line including a gate electrode and a gate pad;

sequentially depositing silicon nitride (SiNx), amorphous silicon (a-Si) and impurity-doped amorphous silicon (n+ a-Si) on an entire surface of the substrate, wherein SiNx is a gate insulating layer;

etching the a-Si and the n+ a-Si to form an active layer and an ohmic contact layer, respectively, wherein the active layer and the ohmic contact layer constitute a semiconductor layer;

depositing a second metallic material on the entire surface of the first substrate, to form a data line including source and drain electrodes spaced apart from each other;

forming a channel through exposing the active layer between the source and drain electrodes; wherein a thin film transistor (TFT) including the gate electrode, the semiconductor layer, and the source and drain electrodes is formed;

forming a passivation layer on the TFT, the gate line and the data line through one of depositing and coating a material for the passivation layer, wherein the passivation layer has a drain contact hole exposing the drain electrode through a photolithography process;

forming a black matrix and a light shielding pattern on the passivation layer over the TFT, the gate line and the data line, the black matrix shielding the TFT such that light is prevented from entering the TFT and the light shielding pattern shielding the first non-display region adjacent to the display region;

coating an organic insulating material on the black matrix and the light shielding pattern, the organic insulating material forming a protection layer, wherein the protection layer has a contact hole corresponding to the drain contact hole formed through a photolithography process;

depositing a transparent conductive material on the protection layer to form a pixel electrode, wherein the pixel electrode is connected to the drain electrode through the drain contact hole; and forming an orientation film on the pixel electrode to align a liquid crystal layer;

wherein the light shielding pattern includes an organic material absorbing light and is simultaneously formed with the black matrix corresponding to a switching device;

providing a second substrate facing and spaced apart from the first substrate, the second substrate including a second non-display region corresponding to the first non-display region;

forming a light absorption layer on an inner surface of the second substrate;

forming a cholesteric liquid crystal color filter (CCF) layer at the display region and the second non-display region on the light absorption layer;

forming a retardation plate on an outer surface of the first substrate opposite to an inner surface of the first substrate on which the TFT is formed; and forming a polarizing plate on the retardation plate, wherein the CCF layer faces the light shielding pattern in the first and second non-display regions.

2. The method according to claim 1, wherein a photolithography process is used to deposit the first metallic material including exposure, development and etch processes.

3. The method according to claim 1, wherein the a-Si and the n+a-Si are formed using a photolithography process.

4. The method according to claim 1, wherein depositing a second metallic material on an entire surface of the substrate includes a photolithography process.

5. The method according to claim 1, wherein depositing a transparent conductive material includes a photolithography process.

* * * * *